Nov. 22, 1927.

J. A. MILLIKEN

GLASS CUTTING MACHINE

Filed Sept. 11, 1925

INVENTOR.
John A. Milliken,
BY
Cornelius L. Ehret
Li, ATTORNEY.

Nov. 22, 1927.  
J. A. MILLIKEN  
1,650,375  
GLASS CUTTING MACHINE  
Filed Sept. 11, 1925  
7 Sheets-Sheet 4

INVENTOR.
BY John A. Milliken,
his ATTORNEY.

Nov. 22, 1927.

J. A. MILLIKEN 1,650,375

GLASS CUTTING MACHINE

Filed Sept. 11, 1925       7 Sheets-Sheet 6

INVENTOR.
John A. Milliken,
BY
his ATTORNEY.

Nov. 22, 1927.

J. A. MILLIKEN 1,650,375

GLASS CUTTING MACHINE

Filed Sept. 11, 1925

INVENTOR.

John A. Milliken,

BY

Cornelius D. Ehret

ATTORNEY.

Patented Nov. 22, 1927.

1,650,375

UNITED STATES PATENT OFFICE.

JOHN A. MILLIKEN, OF EGG HARBOR CITY, NEW JERSEY, ASSIGNOR TO JOHN E. MARSDEN, OF MOUNT AIRY, PHILADELPHIA, PENNSYLVANIA.

GLASS-CUTTING MACHINE.

Application filed September 11, 1925. Serial No. 55,741.

My invention relates to machines for cutting or grinding articles, such as domestic glassware, tumblers, and the like, for applying ornamental designs thereto.

In accordance with my invention, the chuck or other work-carrying mechanism of a grinding or cutting machine is suitably controlled to effect either intermittent or non-intermittent rotative movement thereof. Further, in accordance with my invention, a cutter or grinder, alternately movable toward and from an article on an intermittently rotating chuck, is controlled by suitable mechanism to effect movement thereof toward said article only at a certain predetermined period, or for successive periods, and to prevent movement thereof toward said article at another predetermined period, or for successive periods, and more particularly, the cutter or grinder is controlled by a pattern control member rotatable in response to rotation of the chuck shaft.

My invention resides in apparatus of the character hereinafter described and claimed.

For an illustration of some of the various forms my invention may take, reference is to be had to the accompanying drawings, in which.

*The chuck rotating mechanism (intermittent).*

Figures 3, 4:
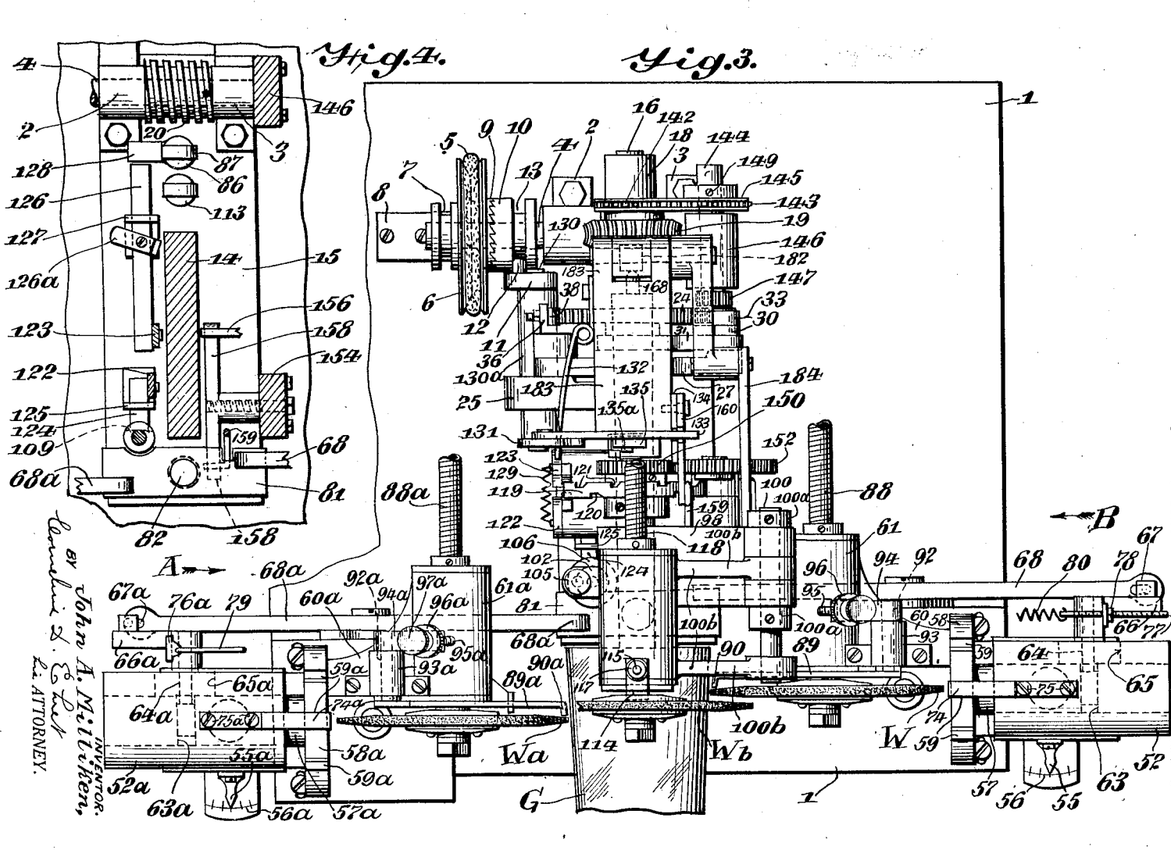
Fig. 3 is a plan view of the mechanism shown in Figs. 1 and 2.
Fig. 4 is a sectional view, partly in elevation, taken on the line 4—4 of Fig. 1.
Figure 7:
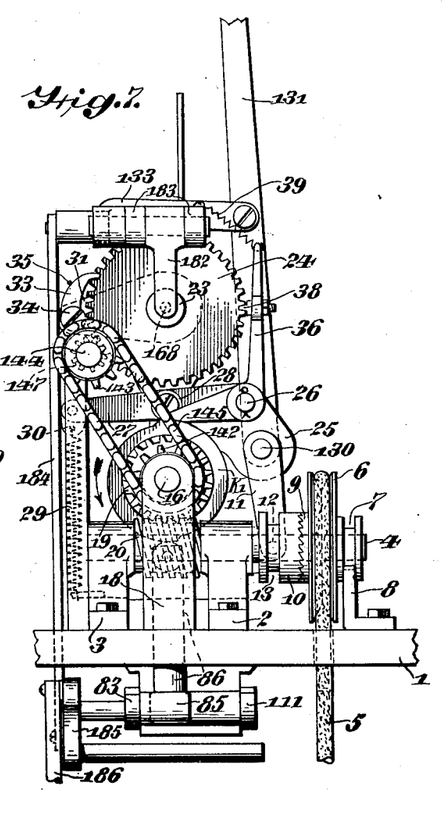
Fig. 7 is an elevational view of the rear of the machine, showing part of the driving mechanism.

Referring to Figs. 3 and 7, there is illustrated a base 1 supporting the bearing brackets 2 and 3 in turn supporting the main drive shaft 4. A belt 5, or equivalent, connected to any suitable source of power (not shown) drives a pulley 6 freely rotatable on the drive shaft 4. Pulley 6 may be retained in position on shaft 4 in any suitable manner, preferably, however, by providing a circumferential groove 7 therein to receive one end of an L-shaped bracket 8 carried by the base 1. A clutch element 9 suitably secured to pulley 6 rotates therewith and co-operates with a movable clutch element 10 splined to drive shaft 4 to effect rotation of said shaft when pulley 6 is driven. A clutch actuating lever 11 pivotally supported as hereinafter described, is provided with a pin 12 received in a circumferential groove 13 in the clutch element.

Figures 1, 13, 14:
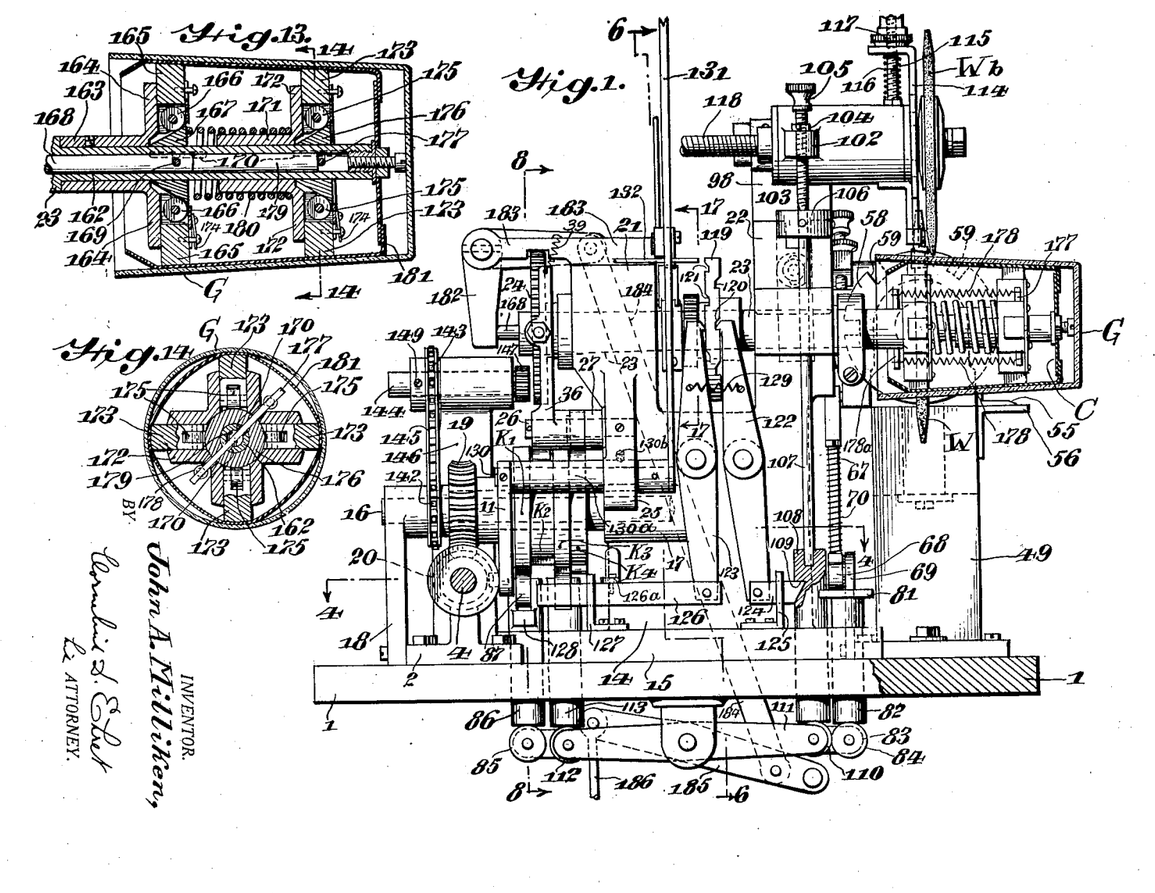
Fig. 1 is a vertical side elevational view, partly in section, of apparatus embodying my invention, looking in the direction of the arrow A, Fig. 3.
Fig. 13 is a longitudinal sectional view, on enlarged scale, through the chuck and a glass tumbler held thereby.
Fig. 14 is a vertical sectional view, partly in elevation, taken on the line 14—14 of Fig. 13.

Referring to Fig. 1, the frame 14 of the machine is shown as comprising a base 15 supported and carried by the base 1. A cam shaft 16 is rotatably supported at one end in an enlarged portion 17 of the frame 14 and at its other end in a bearing bracket 18 resting upon the base 1. A gear 19 keyed to shaft 16 meshes with and is driven by a worm gear 20 likewise keyed to drive shaft 4. Cam shaft 16 carries four cams $K^1$, $K^2$, $K^3$, and $K^4$, utilizable as hereinafter described.

The frame 14 comprises a pair of vertically extending spaced columns 21 and 22 forming bearings for the hollow chuck shaft 23 carrying at one end a chuck designated generally at C and adjacent its other end a ratchet wheel 24.

Figures 2, 21:
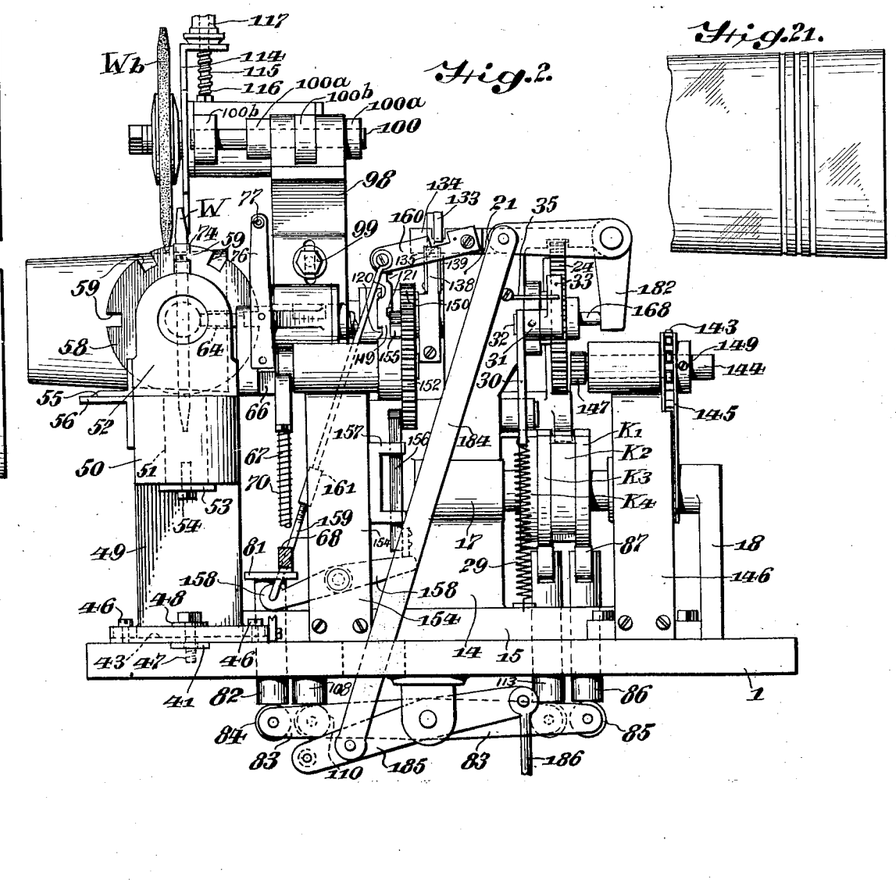
Fig. 2 is a vertical side elevational view, partly in section, of apparatus embodying my invention, looking in the direction of the arrow B, Fig. 3.
Figs. 19, 20 and 21 are side elevational views, respectively, of tumblers having applied thereto a design producible by the mechanism herein described.
Figure 8:
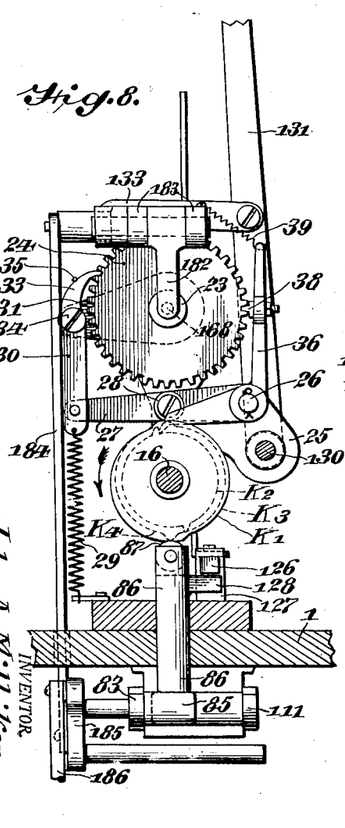
Fig. 8 is a vertical transverse sectional view taken on the line 8—8 of Fig. 1.
Figure 9:
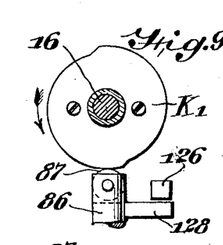
Figs. 9, 10 and 11 are end elevational views, partly in section, of several cams and their followers.
Figure 10:
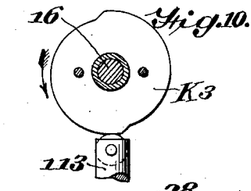
Figure 11:
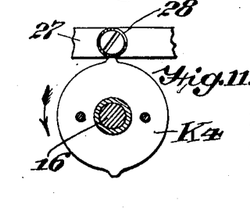

A laterally extending arm 25 (Fig. 7) of the frame 14 supports a stub shaft 26. A rocker arm 27 (Figs. 1, 7 and 8), freely oscillatory on shaft 26, carries a cam roller 28 biased into engagement with the cam $K^4$ by a spring 29, or equivalent, secured at one end to the base 15 and at its other end to a vertically extending link 30 pivoted to rocker arm 27. A ratchet lever 31 is loosely mounted on chuck shaft 23 and a stud 32 received in a perforation in the end of link 30 is pinned to said ratchet lever (Fig. 2). A pawl 33, freely oscillatory on stud 32, is received between ratchet lever 31 and a suitable retaining device as screw 34 threaded into the end of stud 32. A spring 35, or equivalent, conveniently secured to a part of the machine, functions to hold pawl 33 in engagement with ratchet wheel 24.

Stub shaft 26 also supports a bell-crank lever 36, one arm of which is provided with a cam follower 37 and the other arm with a holding pawl 38. A coil spring 39, or equivalent, secured to a relatively fixed part of the machine is detachably secured to bell crank lever 36 and biases pawl 38 into engagement with ratchet wheel 24, and cam follower 37 into engagement with cam $K^2$.

Assuming that clutch elements 9 and 10 are in engagement and that belt 5 is rotating pulley 6, shaft 4 will drive shaft 16 and thereby rotate cams $K^2$ and $K^4$. Just prior to the time that the high point of cam $K^4$ engages roller 28, the high point of cam $K^2$ engages cam follower 37 to move holding pawl 38 from engagement with ratchet wheel 24. Immediately thereafter, the high point of cam $K^4$ engages roller 28, raising arm 30, the associated structure and pawl 33 to rotate ratchet wheel 24, shaft 23 and chuck C a distance corresponding to that between adjacent teeth on said ratchet wheel. As the high point of cam $K^4$ passes on, pawl 33 drops into engagement with the next lower tooth on ratchet wheel 24 and holding pawl 38 moves into engagement with said ratchet wheel on the other side thereof under the influence of spring 39. During continued rotation of cam shaft 16, cam $K^4$ functions to intermittently rotate ratchet wheel 24 and chuck C, and in each instance cam $K^2$ temporarily moves holding pawl 38 from engagement with ratchet wheel 24 to permit such rotation, and thereafter spring 39 moves the holding pawl back into engagement with the ratchet wheel to positively lock the chuck against movement until the next cycle of operation.

*The side grinding wheels (spotting).*

In decorating glasses, tumblers, or similar articles, it is desirable to utilize two grinding wheels whose axes lie in a substantially horizontal plane one on each side of the chuck. At other times, it may be desirable to utilize a larger number of such wheels, for example, three, in which case it is preferable that the third wheel be located substantially directly above the chuck.

Figure 5:
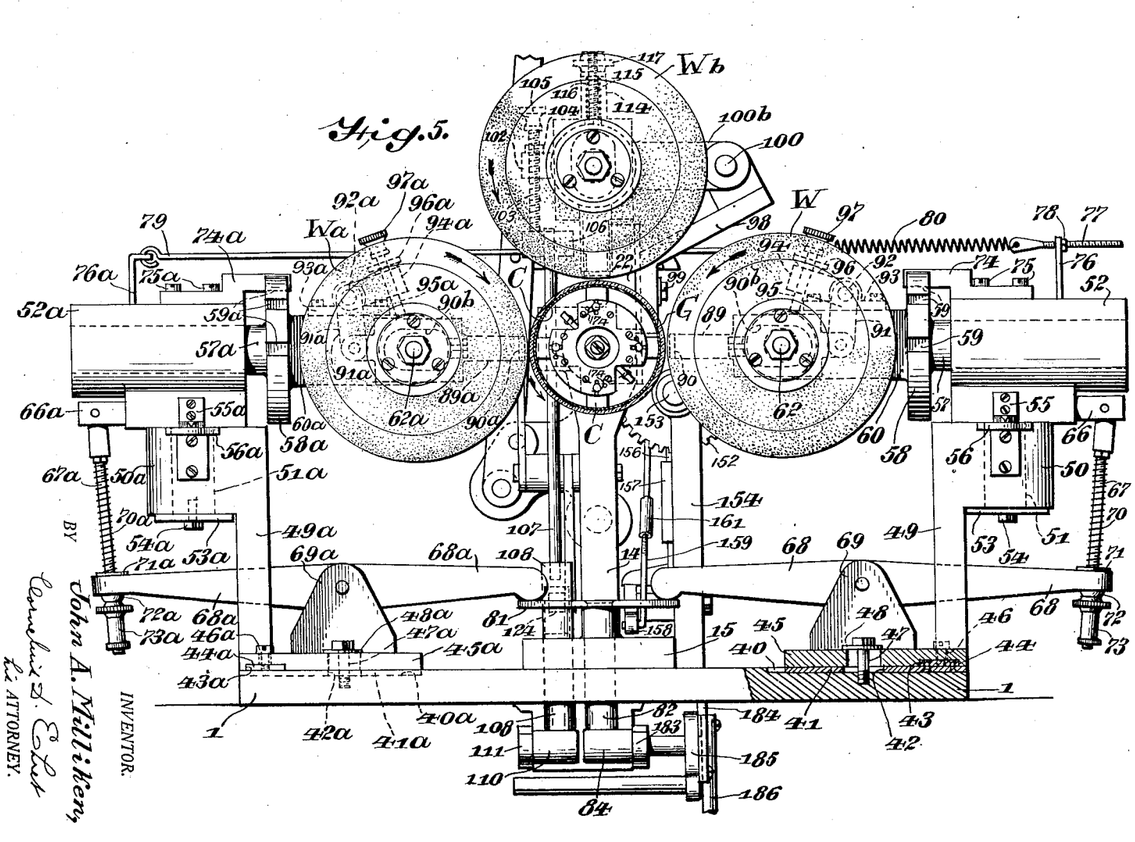
Fig. 5 is a front elevational view, partly in section, of mechanism embodying my invention.

Referring to Fig. 5, there are illustrated two grinding wheels W and $W^a$ whose axes lie in substantially the same horizontal plane, one on each side of the chuck C carrying the article G to be cut or decorated. The mechanism for supporting and operating the wheel $W^a$ is a duplicate of that utilized with the wheel W. Hence, for the sake of brevity, the description will be limited to the wheel W, and the corresponding reference characters with the subscript "a" added will be applied to corresponding parts of the supporting and operating structure for the wheel $W^a$.

Still referring to Fig. 5, the base 1 is provided with a slot 40 extending toward the frame 14, said slot shown as receiving a slide 41 provided with a slot 42. A second slide 43 secured to and extending at right angles to the slide 41 is received in a slot 44 formed at right angles to slot 40 in the supporting member 45. One or more screws 46 passing through a slot in said member 45 is or are threaded into the slide 43, and a second screw 47 passing through a washer 48 extends through a hole in said member 45 of less diameter than the washer, through the slot 42 and is threaded into the base 1. Upon loosening screw 47, the supporting member 45 and the slides 41 and 43 may be moved toward and from the frame 14. Then, by loosening screws 46, supporting member 45 may be adjusted in a direction at right angles to the direction of the adjustment first effected.

A column 49 rising from the supporting member 45 terminates in a perforated block 50 receiving the vertically extending shank 51 of a housing 52 which, therefore, may be rotated around a center defined by the longitudinal axis of the shank 51. A clamping washer 53 is interposed between the bottom of block 50 and the head of a screw 54.

When said screw is threaded into shank 51, housing 52 is retained in adjusted position. It is desirable that such position be indicated by a pointer 55 carried by the housing in conjunction with a scale 56 carried by block 50.

Figure 6:
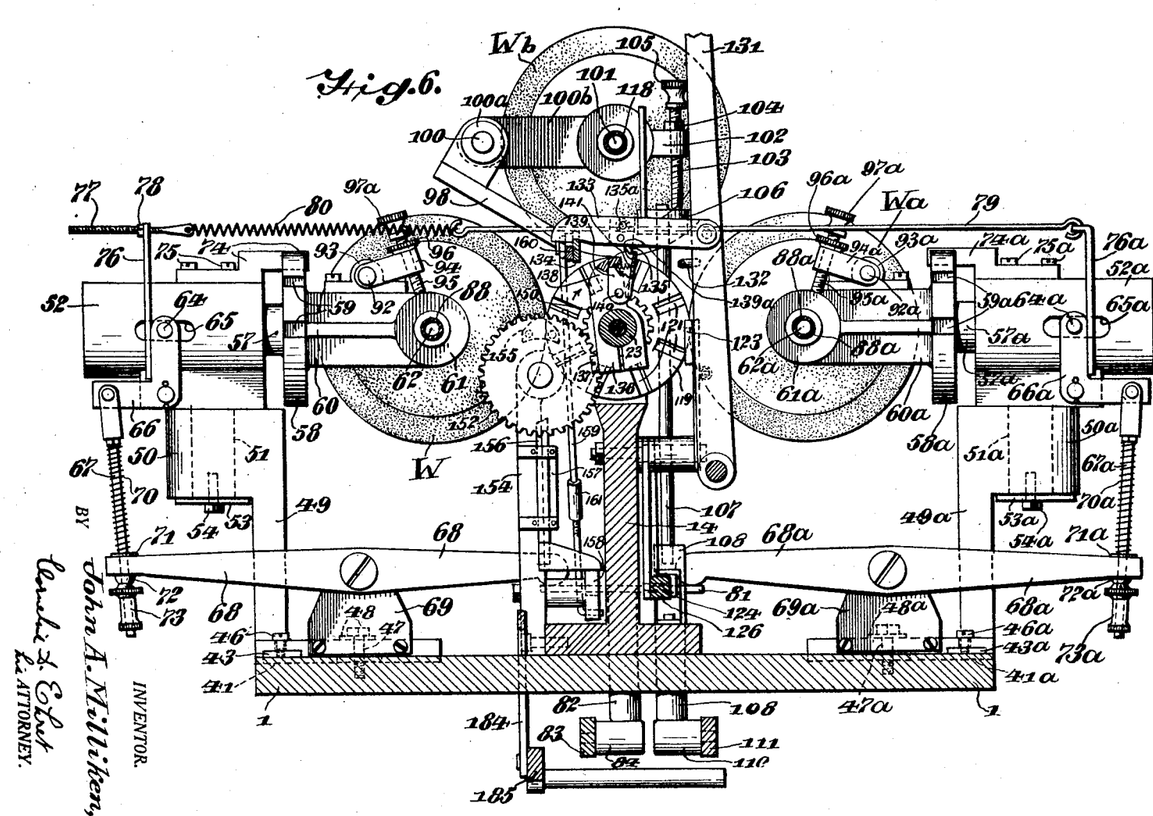
Fig. 6 is a vertical transverse section, partly in elevation taken on the line 6—6 of Fig. 1.

Housing 52 functions as a bearing for a longitudinally extending shaft 57 terminating in a disk 58 having a number of slots 59 in its periphery. A member 60 preferably formed integrally with shaft 57 and disk 58, extends toward the chuck C and serves as a bearing 61 for the grinding wheel shaft 62 (Fig. 6). The grinding wheel W comprises a disk-like abrading element of desired character suitably secured to shaft 62 in a manner well understood in the art.

Referring to Figs. 3 and 6, the shaft 57 is shown as comprising a circumferential slot 63 receiving a pin 64 passing through a slot 65 in the housing 52. A bell crank lever 66 pivoted to housing 52 has one arm connected to pin 64 and the other arm pivotally connected to a rod 67 slidable in the end of a cam lever 68 pivoted in a bearing 69 suitably secured to and movable with the supporting member 45. A coil spring 70 confined on rod 67 bears against a washer 71 and holds cam lever 68 against another washer 72, engaging adjusting nut 73.

One end of a locking lug 74 suitably secured to housing 52, as by screws 75, is received in a slot 59 of the disk 58. Screws 75 may be readily removed and disk 58 rotated until wheel W lies at a desired angle with respect to the article on chuck C, whereupon when lug 74 is re-positioned wheel W will be positively retained at the desired angle.

A standard 76 suitably secured to bell crank lever 66 extends upwardly and receives a screw rod 77 adjustable therein and held in adjusted position by a lock nut 78. A substantially standard 76ª secured to bell crank lever 66ª is connected to a link 79, and a coiled spring 80, or equivalent, is connected between the free ends, respectively, of the link and the screw rod 77. Spring 80 tends to rock the upper arms of the bell crank levers 66 and 66ª to move the wheels W and Wª toward the chuck, as hereinafter described.

The free ends of cam levers 68 and 68ª rest upon a plate 81 carried by a rod 82 reciprocatory in an opening in the base 1 of the machine. One end of a lever 83 pivoted in a bearing carried by the bottom surface of base 1 (Figs. 1 and 2) carries a roller 84 engaging rod 82, and the other end of said lever carries a roller 85 engaging a rod 86 reciprocatory in an opening in the base 1. A roller 87 mounted in the bifurcated upper end of rod 86 engages cam K¹.

As shown in Fig. 3, flexible shafts 88 and 88ª driven by any suitable source of power (not shown) connect, respectively, with the grinding wheel shafts 62 and 62ª to rotate grinding wheels W and Wª at substantially constant speed in the direction of the arrows (Fig. 5); or rigid shafts combined with structure permitting movement of said shafts, as universal joints, may be substituted for the flexible shafts 88 and 88ª.

To the end that the depth of the cut may be regulated, the grinding wheels W and Wª are provided, respectively, with duplicate mechanisms for controlling the degree of movement toward the chuck C. As shown in Figs. 3 and 5, a depth gauge 89 is provided at one end with a flange 90 adapted to move into engagement with the article on the chuck C after the grinding wheel W has cut or ground such article to a predetermined depth. Gauge 89 is provided with an elongated slot 90ᵇ through which the grinder wheel shaft 62 passes. One end of a link 91 is pivoted to the end of gauge 89 and the other end of said link is secured to a shaft 92 rotatable in a bearing 93 suitably secured to the member 60. An arm 94 secured to shaft 92 is threaded to receive an adjusting screw 95 carrying a lock nut 96 and a head 97.

As adjusting screw 95 is moved downwardly (Fig. 5), shaft 92 and link 91 are moved in a counter-clockwise direction and depth gauge 89 is moved from the chuck, whereupon lock nut 96 may be moved into engagement with arm 94 to positively retain gauge 89 in the desired position. Thereafter, as the grinding wheel W reciprocates with respect to chuck C, the article thereon is cut to a greater depth. Obviously, reverse movement of screw 95 will move gauge 89 toward the chuck to effect cuts of less depth.

As stated aforesaid, reciprocatory movement of plate 81 is controlled by cam K¹. The high point of this cam is so arranged with respect to the high points of cams K² and K⁴ that plate 81 will be raised prior to the time that the latter cams function to step the chuck. As plate 81 moves upwardly, levers 68 and 68ª are rocked, rods 67 and 67ª are moved downwardly, and the upper arms of bell crank levers 66 and 66ª cause the grinder wheels W and Wª to slide away from the chuck C. Cam K¹ holds plate 81 in elevated position for a definite interval during which cams K² and K⁴ step the chuck through a part of a revolution. Thereupon, the high point of cam K¹ passes on, and spring 80 moves the rotating grinding wheels into engagement with the article on chuck C amounts depending on the setting of depth gauges 89 and 89ª.

*The third wheel (spotting).*

Referring to Figs. 2 and 5, a support 98 is adjustably secured to the column 22 in any suitable manner as by a screw 99 passing through a slot in said support and into column 22. A shaft 100 mounted in the bifurcated end of support 98 is held against axial movement by collars 100ª keyed thereto (Fig. 3). Spaced arms 100ᵇ loosely mounted on shaft 100 terminate in a bearing for a shaft 101 having the third grinding wheel Wᵇ suitably secured thereto in a manner well understood in the art. A threaded extension 102 forming a part of arm 100 receives an adjusting screw 103 having a lock nut 104 and a head 105. Screw 103 rests upon a plate 106 secured to a rod 107 reciprocatory in the column 22 (Fig. 1), said rod terminating in an enlarged rod 108 having a notch 109 for a purpose hereinafter described. Rod 108 extends through the base 15 of the frame 14 and the base 1 of the machine and rests upon a roller 110 carried by a lever 111 pivoted in a bearing on the bottom surface of base 1, said lever at its other end carrying a roller 112 upon which rests a rod 113 passing through the base 1 and the base 15 of the frame 14 into engagement with the cam K³.

Any suitable device may be utilized for regulating the depth of the cut made by the grinding wheel Wᵇ. Preferably, as shown in Figs. 2 and 5, a gauge 114, slotted to receive shaft 101, has a flanged end receiving a pin 115 rising from the bearing for shaft 101. A coiled spring 116, or equivalent, retains gauge 114 in engagement with a nut 117 threaded to pin 115. Obviously, by adjusting nut 117, gauge 114 will be moved with respect to wheel Wᵇ and when in an adjusted position determines the depth of the cut made by said wheel.

Grinding wheel Wᵇ is rotated at substantially constant speed in the direction of the arrow (Fig. 5). As shown in Fig. 3, a flexible shaft 118 connects the shaft 101 of grinding wheel Wᵇ to any suitable source of power (not shown). However, it is to be understood that said grinding wheel may be driven by other suitable structure, such, for example, as described aforesaid with respect to the wheels W and Wª.

Reciprocatory movement of plate 106 is controlled by cam K³, the high point thereof raising said plate to move grinding wheel Wᵇ from engagement with the article on the chuck C at substantially the same time that cam K¹ raises plate 81 to move grinding wheels W and Wª from said article. During the period that plate 106 holds grinding wheel Wᵇ in elevated position, cams K² and K⁴ step the chuck through a part of a revolution. Thereupon, the high point of cam K³ passes on and grinding wheel W² is biased by the action of gravity into engagement with the article on chuck C an amount depending upon the setting of the depth gauge 114. Obviously, a spring, or equivalent, may be utilized in supplementing the action of gravity to move grinding wheel Wᵇ into grinding position.

*The pattern control mechanism.*

To the end that a variety of designs may be imparted at will to various articles, it is necessary that movements of the several wheels with respect to an article on the chuck be controlled in a certain predetermined manner. For example, in Fig. 19, the outer rows of indentations a and a¹ are effected by wheels W and Wª positioned as shown in Fig. 3 and the intermediate row b by wheel Wᵇ also positioned as shown in Fig. 3. However, in order to obtain the design illustrated, it is necessary to prevent wheels W and Wª from engaging the article for three successive periods after having engaged and cut said article for a like number of periods. Likewise, it is necessary that wheel Wᵇ after forming one indentation of the intermediate row b be prevented from engaging the article for four successive periods.

In order that the various wheels may be controlled as above indicated, and also in numerous other ways, I provide a plurality of pattern control members each capable of causing a different design to be formed on the article; and when it is desired to decorate an article in a certain manner, the control member corresponding to that decoration is utilized.

As one manner of accomplishing this end, a pattern control member 119 may be keyed to chuck shaft 23 (Fig. 1). Preferably, member 119 is shaped substantially as a disc, and on each face is provided respectively with a row of circumferentially extending notches 120 and 121. Each of a pair of duplicate pawl levers 122 and 123 pivoted to frame 14 co-operates, respectively, with the notches 120 and 121. A latch 124, pivoted to lever 122 and slidably mounted in a bracket 125 secured to base 15, is moved alternately into and from engagement with notch 109 of rod 108 as the free end of lever 122 drops into a notch 120 or rides along the surface of member 119 between notches. Another latch 126 pivoted to lever 123 and slidably mounted in a bracket 127 secured to base 15 is moved alternately above or from a projection 128, preferably formed integrally with the rod 86 as the free end of lever 123 drops into a notch 121 or rides along the surface of member 119 between notches. A spring 129, or equivalent, suitably secured to levers 122 and 123 biases the upper ends thereof into engagement with the member 119.

Chuck shaft 23 rotating intermittently under the influence of cams K² and K⁴ causes like movement of pattern control member 119 keyed thereto. As stated aforesaid, such rotary movement occurs only when grinder wheel $W^b$ is in elevated position, at which time notch 109 of rod 108 is in the position shown in Fig. 1. If a notch 120 is advanced and stops opposite the pawl end of lever 122 during such a period, the lever under the influence of spring 122 is rocked on its pivot and latch 124 moved into notch 109. Thereafter, when the high point of cam $K^3$ passes on, grinder wheel $W^b$ is prevented from descending into engagement with and cutting the article on chuck C. If during the next movement of control member 119 another notch is likewise positioned opposite the pawl end of lever 122, the grinder wheel will again be prevented from cutting the article, and such action will continue until control member 119 at the end of a partial revolution does not position a notch opposite said pawl end of the lever 122. Under such circumstances, latch 124 will not move into notch 109, and as the high point of cam $K^3$ passes on, grinder wheel $W^b$ will be permitted to descend into engagement with and cut the article on chuck C.

Movement of grinding wheels W and $W^a$ into engagement with the article on chuck C is governed in a manner substantially similar to that described above. As shown in Fig. 1, the free end of pawl lever 123 when moving into a notch 121 shifts the latch 126 above the projection 128. During the period that chuck C is rotating, the high point of cam $K^1$ holds rod 86 in its depressed position, and if a notch 121 stops opposite the free end of lever 123, lever 126 will be positioned above the projection 128 to hold the member 86 in its depressed position. When so held, spring 80 is ineffective to shift wheels W and $W^a$ into engagement with the article on chuck C. The latch 126 is similarly positioned above projection 128 whenever a notch 121 stops opposite the free end of lever 123, and it is not until the chuck shaft 23 at the end of a partial revolution does not position a notch opposite said free end of the lever 123 that latch 126 is prevented from moving above projection 128 as the high point of cam $K^1$ passes on. Under such circumstances, rod 86 is free to rise and spring 80 moves grinders W and $W^a$ into engagement with the article.

If desired lever 126, adjacent bracket 127 (Figs. 1 and 4) may be provided with a latch $126^a$ which may be set substantially parallel with lever 126 and in so doing cooperate with bracket 127 to hold said lever toward the right away from projection 128 (Fig. 1). In this manner, the free end of pawl lever 123 is prevented from dropping into a notch 121, and, accordingly grinding wheels W and $W^a$ are placed under the sole control of cam $K^1$. Likewise, when desirable, pawl lever 122 and latch 124 may be controlled in a substantially similar manner to place grinding wheel $W^b$ under the sole control of cam $K^3$.

*The clutch releasing mechanism.*

As stated aforesaid, a lever 11 actuates the movable clutch element 10. Lever 11 is keyed to a shaft 130 mounted in a bearing $130^a$ comprising an elongated sleeve suitably secured as by lock screw $130^b$ in an offset portion 25 of the frame 14 (Fig. 1). Another lever 131 likewise keyed to said shaft is biased by a spring 132, or equivalent (Fig. 6), in a direction to shift clutch element 10 from element 9 and disconnect the power from the machine. A lever 133 pivoted to lever 131 is notched at its free end to fit over a latch 134 suitably secured to the column 21. Lever 133 carries a cam 135 detachably secured thereto by screw $135^a$ and utilizable as hereinafter described, (Fig. 6).

A split collar 136, suitably secured to chuck shaft 23, as by the screw 137, (Fig. 6) comprises an outwardly extending recessed arm 138 having a channel-shaped member 139 pivoted thereto at 140. One end of a coiled spring 141, or equivalent, fits in the recess in arm 138, and the other end thereof bears against one face of member 139.

To initiate operation of the machine, lever 131 is moved in a counter-clockwise direction (Fig. 6) against the action of spring 132, and lever 133 drops over latch 134. Thereafter, the chuck shaft is intermittently stepped in a clockwise direction (Fig. 6) until the outer edge of member 139 engages the sloping part of cam 135. During slight continued rotative movement of chuck shaft 23 and arm 138, member 139 remains stationary, and spring 141 is compressed.

Finally, however, when spring 141 is substantially compressed, arm 138 engages the wall $139^a$ of member 139, and, as chuck shaft 23 and arm 138 continue slight rotation, cam 135 and lever 133 are forced upwardly, raising said lever from engagement with latch 134. When so disengaged, spring 132 immediately swings lever 131 in clockwise direction (Fig. 6) to disengage the clutch elements and stop the machine. When cam 135 is forced upwardly out of the path of member 139, coil spring 141 immediately becomes effective to snap member 139 in a clockwise direction (Fig. 6) past the cam 135. Due to the different positions now assumed by member 139, rotation of shaft 23 and arm 138 may be next initiated from substantially the same point as that at which rotation ceased.

*The chuck rotating mechanism (non-intermittent).*

To effect banding of an article on the chuck C, it is necessary to adjust screws 73 and $73^a$ downwardly, (Fig. 6) an amount sufficient to prevent levers 68 and 68ª from moving the grinding wheels W and Wª from the chuck when the inner ends of said levers are moved upwardly by plate 81. After effecting an adjustment of this character, spring 80 retains said wheels against the article on the chuck while the ends of levers 68 and 68ª idle, respectively, on the rods 67 and 67ª when rocked by plate 81.

Figure 18:
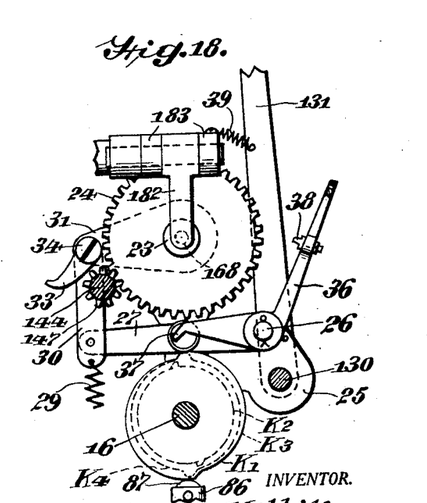
Fig. 18 is a fragmentary vertical transverse sectional view taken on the line 8—8 of Fig. 1, showing the parts arranged for non-intermittent rotation of the chuck.

As stated above, cams $K^2$ and $K^4$ effect intermittent movement of chuck shaft 23, the former by releasing the holding pawl 38 and the latter by actuating the pawl 33. To effect non-intermittent movement of shaft 23, springs 35 and 39 are dissociated from the respective pawls, whereupon these members assume the position shown in Fig. 18. With the various operating parts in this condition, cams $K^2$ and $K^4$ are functionless in the operation of the machine.

Shaft 16, which rotates constantly whenever the clutch elements 9 and 10 are in engagement, is provided with a sprocket wheel 142 (Figs. 1 and 7) driving sprocket 143 and shaft 144 by a sprocket chain 145. Shaft 144 rotates in a bearing formed in a column 146 secured to the base 1. This shaft is provided with a gear 147, movable into meshing engagement with ratchet wheel 24 keyed to the chuck shaft 23 when set screw 149 threaded into a collar on sprocket 143 is released from engagement with shaft 144. With gears 147 and 148 in mesh, chuck shaft 23 rotates constantly when clutch members 9 and 10 are engaged.

Figure 17:
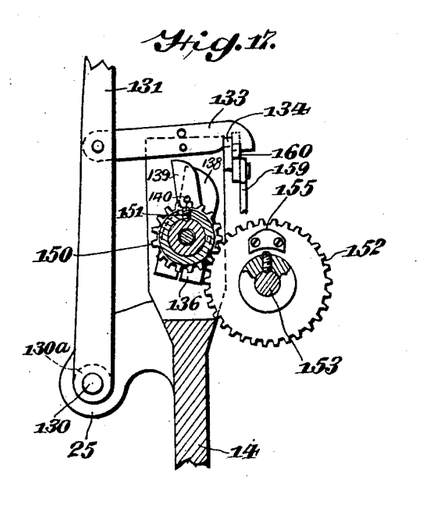
Fig. 17 is a vertical fragmentary sectional view, partly in elevation, on the line 17—17 of Fig. 1, showing the parts arranged for non-intermittent rotation of the chuck.

During intermittent rotation of chuck shaft 23, a gear 150 idles thereon (Fig. 17). When effecting non-intermittent rotation, this gear is secured to the chuck shaft in any suitable manner, as by the set screw 151, (Figs. 3 and 17). When so secured, gear 150 drives gear 152 keyed to a shaft 153 mounted in a bearing in a standard or column 154, secured to the base 1. The diameter of gears 150 and 152 is so arranged that gear 150 rotates through two revolutions as gear 152 moves through one revolution. Cam 155, suitably secured to the face of gear 152, once for each revolution of said gear, engages a rod 156 reciprocatory in a guiding member 157 suitably secured to the column 154 (Fig. 2). A lever 158, pivoted to the column 154, is actuated by rod 156, and when so actuated moves the plate 81 upwardly, (Fig. 2). One end of a rod, link or equivalent 159 is pivoted to the end of lever 158, and said rod is pivoted at its other end to a notched lever 160, pivoted to the column 21. Preferably, rod 159 is formed in two parts; a turn buckle 161 connecting said parts constitutes a medium for changing the effective length of said rod. Notched lever 160 is utilized to disengage lever 133 from the latch 134, (Fig. 6), to the end that clutch elements 9 and 10 may be disengaged. During non-intermittent rotation of the chuck C, lever 33 is under sole control of lever 160, for during this phase of operation the member 139 is prevented from raising lever 133 since screw 135ª and cam 135 have been removed therefrom.

Assuming that an article is in place on chuck C and that the constantly rotating grinding wheels W and Wª are in engagement therewith, lever 131 is moved in a counter-clockwise direction (Fig. 6), and the notched end of lever 133 engaged with latch 134. Thereafter the grinding wheels function to apply a plurality of bands to the article, for example, as indicated in Fig. 21. As gear 152 completes one revolution the article on chuck C completes its second revolution in engagement with the grinding wheels, whereupon, cam 155 engages rod 156 which rocks lever 158 to move plate 81 upwardly a substantially greater amount than said plate is moved when controlled by the cam $K^1$. When so moved, plate 81 moves the outer ends of levers 68 and 68ª downwardly into engagement respectively with washers 72 and 72ª and nuts 73 and 73ª, whereupon the upper arms of bell crank levers 66 and 66ª move away from the chuck to move grinding wheels W and Wª from engagement with the article thereon. As lever 158 moves plate 81 upwardly, rod 159 is also moved upwardly, whereupon lever 160 engages the end of lever 133 to disengage the latter from latch 134, spring 132 then becoming effective to swing lever 131 in a clockwise direction, (Fig. 6), and disengage the clutch elements 9 and 10.

Inasmuch as gear 152 rotates once for two revolutions of chuck shaft 23, each grinding wheel is in engagement with the article on the chuck C for substantially two revolutions of said article. In this manner the bands are applied to the entire periphery of the glass, a result usually not attainable when the banding operation is performed with but one revolution of the article on the chuck.

Preferably the third wheel $W^2$ is not utilized in connection with the banding operation. To the end that the action of such wheel may be eliminated, screw 103 is threaded downwardly to raise arm 100ᵇ an amount sufficient to prevent grinding wheel $W^b$ from engaging the article on the chuck as said grinding wheel oscillates in response to rotation of the cam $K^3$. Or, if desirable, screw 99 may be withdrawn and the unit comprising the third grinding wheel $W^b$ entirely removed during a banding operation.

As illustrated in Figs. 3 and 5, shafts 57 and 57ª respectively carrying grinding wheels W and Wª are so adjusted in housings 52 and 52ª that the article on chuck C is cut or ground in a plane substantially at right angles to the longitudinal axis of the article. When decorating tapered articles, as the well known type of glass tumbler, each wheel W and Wª may be adjusted by partially rotating housings 52 and 52ª after screws 54 and 54ª have been loosened, whereby the article is cut or ground in directions substantially at right angles to the surface of the article. Pointers 55 and 55ª, co-operating, respectively, with scales 56 and 56ª, serve to indicate the position of wheels W and Wª when an adjustment of this character is effected.

Figure 15:
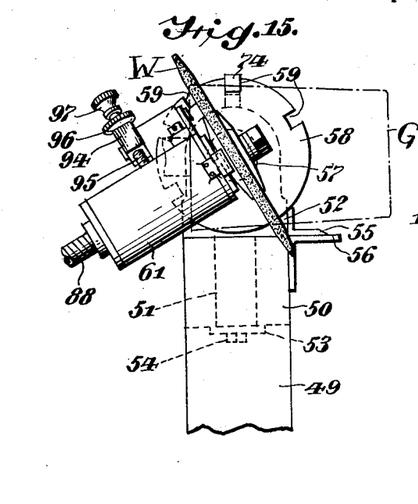
Fig. 15 is a side elevational view showing a side cutter angularly adjusted with respect to the longitudinal axis of a tumbler.
Figure 20:
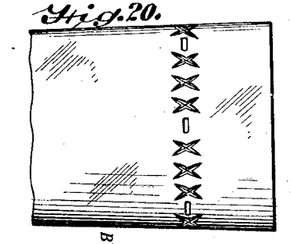

As stated above, locking lugs 74 and 74ª may be removed from notches 59 and 59ª and grinding wheels W and Wª and disks 58 and 58ª partially rotated until the wheels lie at a desired angle with respect to the article on the chuck. When so rotated, such wheels function to form the crossed rows of notches indicated in Fig. 20, and Fig. 15 illustrates such an adjusted position of one of the grinding wheels.

Figure 16:
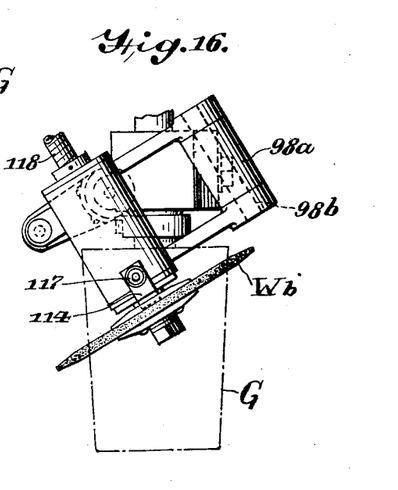
Fig. 16 is a plan view of a top cutter angularly adjusted with respect to the longitudinal axis of a tumbler.
Figure 19:
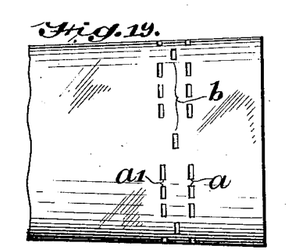

In Figs. 3 and 5, grinding wheel W<sup>b</sup> is shown as adapted to cut or grind the article on chuck C in a plane substantially at right angles to the longitudinal axis of the article, and in so doing may form the intermediate row of notches (Fig. 19). In accordance with my invention, I provide a plurality of grinding wheel units interchangeable one with the other, and each arranged to be separately applied to the column 22. A unit of this character is illustrated in Fig. 16 and differs from the substantially similar unit shown in Fig. 3 principally in that the support, corresponding to member 98 (Figs. 2 and 5), forms a bearing 98ª for the shaft 98<sup>b</sup> extending at an angle to the chuck shaft 23. By providing a plurality of such units each having a bearing, as described above, extending at a different angle with respect to chuck shaft 23, by making a proper selection it is possible when utilizing the third grinding wheel to cut or grind the article on chuck C at a desired angle with respect to the longitudinal axis of said article.

Figure 12:
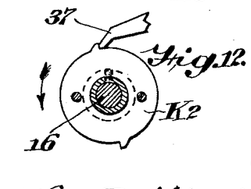
Fig. 12 is an end elevational view, partly in section, of a ratchet.

Any suitable form of chuck may be utilized for holding the article to be ground or cut. In the example illustrated, (Figs. 12, 13 and 14), the hollow chuck shaft 23 has a portion 162, to which is secured the sleeve 163 having the radially extending arms 164 in which are radially slidable the fingers 165, upon which are pivoted the rollers 166, with which co-acts the cone 167 movable longitudinally of the member 162 by a rod 168, actuated as hereinafter described. The rod 168 is movable longitudinally within the shaft 23 and its portion 162, and actuates the pin 169, which extends through a slot 170 in the member 162 and engages the cone 167. Secured upon the member 162 is a second sleeve 171 having the radial arms 172 in which are radially movable the fingers 173, pressed inwardly by springs 174, (Fig. 5), carrying rollers 175 co-acting with the cone 176 actuated by the pin 177 extending through a slot in the member 162. Springs 178 are attached at one end to the pin 177, and at their other end to the pin 178ª, (Fig. 1) whereby the pin 177 is drawn toward the left, as viewed in Fig. 1. Within the bore of the member 162, between the end of the rod 168 and the pin 177, is the separate rod member 179. Confined between the cone 167 and the arms 172 is the spring 180, which thrusts the cone 167 toward the left, (Fig. 13). Surrounding and enclosing the chuck structure generally is the member 181, of rubber or other suitable flexible material, which protects the chuck mechanism from water used for grinding purposes and which impinges upon the exterior of the article on the chuck C, when in position upon said chuck. The member 181 also effects a suitable frictional gripping upon the inner wall of the article due to the outward pressure of the fingers 165 and 173. This outward pressure upon these fingers is due to the thrust of the spring 180 against the cone 167 and the pull upon the cone 176, through the pin 177, of the springs 178.

To release the article from the chuck C, the rod 168 is moved toward the right, (Fig. 13), thereby thrusting the rod 179, pin 177 and cone 176 toward the right in opposition to springs 178, allowing the fingers 173 to recede radially. The same movement of the rod 168 toward the right actuates the cone 167 toward the right through the pin 178ª in opposition to spring 180, permitting the fingers 165 to recede radially. With the fingers so withdrawn, or released from outward pressure, the article on the chuck C is easily removed and another placed in position, whereupon, when pressure is released upon the rod 168, the cones 167 and 176 move toward the left (Fig. 13), forcing the rollers 166 and 175 outwardly, thereby pressing the fingers 165 and 173 outwardly to effectively grip and hold the article.

Rod 168 may be actuated in any suitable manner. Preferably, however, said rod extends within the hollow chuck shaft 23 toward the rear of the machine, and passing beyond the end of said chuck shaft engages one arm of the bell crank lever 182 pivoted in the bifurcated end of a member 183 suitably secured to the standard 21. Pivoted to the other arm of the bell crank lever is a rod or link 184, in turn pivoted adjacent one end of a lever 185 suitably pivoted to the bottom of the base 1. A rod, link, or equivalent 186, pivoted adjacent to the other end of said lever 185, may be actuated by any suitable mechanism, as a foot pedal, (not shown).

What I claim is:

1. Glass cutting apparatus comprising a work holder, a grinding wheel movable with respect thereto, means for effecting intermittent rotative movements of said work holder during one period of time, and means for effecting non-intermittent rotative movement thereof during another period of time.

2. Glass cutting apparatus comprising a work holder, a grinding wheel movable with respect thereto, means for effecting intermittent rotative movements of said work holder, means for effecting non-intermittent rotative movement thereof, and means for rendering either of said means effective at will.

3. Glass cutting apparatus comprising a work holder, a grinding wheel movable with respect thereto, means for effecting intermittent rotative movements of said work holder, means for effecting non-intermittent rotative movement thereof, and means for rendering one of said means ineffective to rotate said work holder and the other of said means effective to rotate said work holder.

4. Glass cutting apparatus comprising a work holder, a grinding wheel movable with respect thereto, cam-controlled means for effecting intermittent rotative movements of said work holder during one period of time, and means for effecting non-intermittent rotative movement thereof during another period of time.

5. Glass cutting apparatus comprising a work holder, a grinding wheel movable with respect thereto, means for effecting intermittent rotative movement of said work holder throughout substantially one revolution, means for effecting non-intermittent rotative movement of said work holder a distance greater than one complete revolution thereof, and means for rendering either of said means effective at will.

6. Glass cutting apparatus comprising a work holder, a grinding wheel movable with respect thereto, and clutch-controlled power mechanism for effecting intermittent rotative movements of said work holder during one period of time or for effecting non-intermittent rotative movement during another period of time.

7. Glass cutting apparatus comprising a work holder, a grinding wheel movable with respect thereto, clutch-controlled power mechanism for effecting intermittent rotative movements of said work holder during one period of time or for effecting non-intermittent rotative movement during another period of time, and means for opening said clutch after said work holder has intermittently rotated substantially one revolution.

8. Glass cutting apparatus comprising a work holder, a grinding wheel movable with respect thereto, clutch-controlled power mechanism for effecting intermittent rotative movement of said work holder during one period of time, and means for effecting non-intermittent rotative movement thereof during another period of time.

9. Glass cutting apparatus comprising a work holder, a grinding wheel biased into engagement with an article on said chuck, means for intermittently withdrawing said wheel from the article, and means for rendering said means ineffective.

10. Glass cutting apparatus comprising a work holder, a grinding wheel biased into engagement with an article on said chuck, means for intermittently withdrawing said wheel from the article, means for rendering said means ineffective, and means for intermittently rotating said chuck.

11. Glass cutting apparatus comprising a work holder, a grinding wheel biased into engagement with an article on said chuck, means for intermittently withdrawing said wheel from the article, means for rendering said means ineffective whereupon the wheel is biased into engagement with said article, means for non-intermittently rotating said chuck a distance greater than one revolution thereof, and means for temporarily withdrawing said wheel from the article.

12. Glass cutting apparatus comprising a work holder, a grinding wheel biased into engagement with an article on said chuck, a cam-rocked lever for intermittently withdrawing said wheel from the article, and means for rendering said lever ineffective to intermittently withdraw said article as said lever continues to rock.

13. Glass cutting mechanism comprising a work holder, a grinding element, means for intermittently moving said element with respect to said work holder, and means for intermittently rendering said means ineffective to move said element.

14. Glass cutting mechanism comprising a work holder, a grinding wheel biased toward said work holder, means for intermittently moving said wheel from the work holder, and cam-controlled means for intermittently preventing movement of said wheel toward the work holder.

15. Glass cutting mechanism comprising an intermittently rotatable work holder, a grinding wheel biased toward said work holder, means for moving said wheel from the work holder while the latter is at rest, and means for intermittently preventing movement of said wheel toward the work holder.

16. Glass cutting mechanism comprising an intermittently rotatable work holder, a grinding wheel biased toward said work holder, means for moving said wheel from the work holder while the latter is at rest, and means operating in unison with said work holder for intermittently preventing movement of said wheel toward the work holder.

17. Glass cutting mechanism comprising an intermittently rotatable work holder, a shaft supporting said work holder, a grinding wheel biased toward said work holder, means for intermittently moving said wheel from the work holder, and means controlled by movement of said shaft for intermittently preventing movement of said grinding wheel toward the work holder.

18. Glass cutting mechanism comprising an intermittently rotatable work holder, a shaft supporting said work holder, a grinding wheel biased toward said work holder, means for intermittently moving said wheel from the work holder, and a pattern-control member carried by said shaft for intermittently preventing movement of said grinding wheel toward the work holder.

19. Glass cutting mechanism comprising a work holder, a grinding element, means for intermittently moving said element with respect to said work holder, means for intermittently rendering said means ineffective to move said element, a second grinding element, means for intermittently moving said second element with respect to said work holder, and means for intermittently rendering said last mentioned means ineffective to move said element.

20. Glass cutting mechanism comprising a work holder, a grinding element, means for intermittently moving said element with respect to said work holder, means operative at one time for intermittently rendering said means ineffective to move said element, a second grinding element, means for intermittently moving said second element with respect to said work holder, and means operative at another time for intermittently rendering said last mentioned means ineffective to move said element.

21. Glass cutting mechanism comprising a work holder, a grinding wheel biased towards said work holder, means for intermittently moving said wheel from the work holder, cam-controlled means operative at one time for intermittently preventing movement of said wheel toward the work holder, a second grinding wheel biased toward said work holder, means for intermittently moving said second wheel from the work holder, and cam-controlled means operative at another time for intermittently preventing movement of said second wheel toward the work holder.

22. Glass cutting mechanism comprising an intermittent rotatable work holder, a shaft supporting said work holder, a grinding wheel biased toward said work holder, means for intermittently moving said wheel from the work holder, means controlled by movement of said shaft for intermittently preventing movement of said grinding wheel toward the work holder at one time, a second grinding wheel biased toward said work holder, means for intermittently moving said wheel from the work holder, and means controlled by movement of said shaft for intermittently preventing movement of said grinding wheel toward the work holder at another time.

23. Glass cutting mechanism comprising an intermittently rotating work holder, a shaft supporting said work holder, a grinding wheel biased toward said work holder, means for intermittently moving said wheel from the work holder, a second grinding wheel biased toward said work holder, means for intermittently moving said second wheel from the work holder, and a pattern-control member carried by said shaft for intermittently preventing movement of said grinding wheels toward the work holder.

24. Glass cutting mechanism comprising an intermittently rotating work holder, a shaft supporting said work holder, a grinding wheel biased toward said work holder, means for intermittently moving said wheel from the work holder, a second grinding wheel biased toward said work holder, means for intermittently moving said second wheel from the work holder, and a pattern-control member carried by said shaft for intermittently preventing movement of said first mentioned grinding wheel toward the work holder at one time and intermittently preventing movement of said second mentioned grinding wheel toward the work holder at another time.

25. Glass cutting mechanism comprising a chuck holder, a grinding wheel biased toward said chuck holder, means comprising a reciprocatory rod for moving said wheel from said work holder, and means intermittently co-acting with said rod for preventing movement of said wheel toward the work holder.

26. Glass cutting mechanism comprising a chuck holder, a grinding wheel biased toward said chuck holder, means comprising a reciprocatory rod for moving said wheel from said work holder, and means comprising a cam-controlled lever intermittently co-acting with said rod for preventing movement of said wheel toward said holder.

27. Glass cutting mechanism comprising a chuck holder, a grinding wheel biased toward said chuck holder, means comprising a reciprocatory rod for moving said wheel from said work holder, and means comprising a pattern-control member and a lever actuated thereby to intermittently co-act with said rod for preventing movement of said wheel toward said work holder.

28. Glass cutting mechanism comprising a chuck holder, a chuck shaft carrying said chuck holder, a grinding wheel biased toward said holder, means for intermittently moving said wheel from the work holder, and means rotatable with said shaft comprising a pattern-control member selected from a group of such members for intermittently preventing movement of said wheel toward the work holder.

29. Glass cutting mechanism comprising a chuck holder, and a grinding wheel angularly adjustable with respect to said chuck holder about an axis substantially normal to the periphery of said chuck holder.

30. Glass cutting mechanism comprising a chuck holder, a grinding wheel angularly adjustable with respect to said chuck holder about an axis substantially normal to the surface of said chuck holder, and means for retaining said chuck holder in adjusted position.

31. Glass cutting mechanism comprising a chuck holder, a grinding wheel angularly adjustable with respect to said chuck holder about an axis substantially normal to the surface of said chuck holder, and means comprising a recessed disk for retaining said chuck holder in adjusted position.

JOHN A. MILLIKEN.